March 8, 1932. H. HUEBER 1,848,296
ADVERTISING DEVICE
Filed May 11, 1928  3 Sheets-Sheet 1
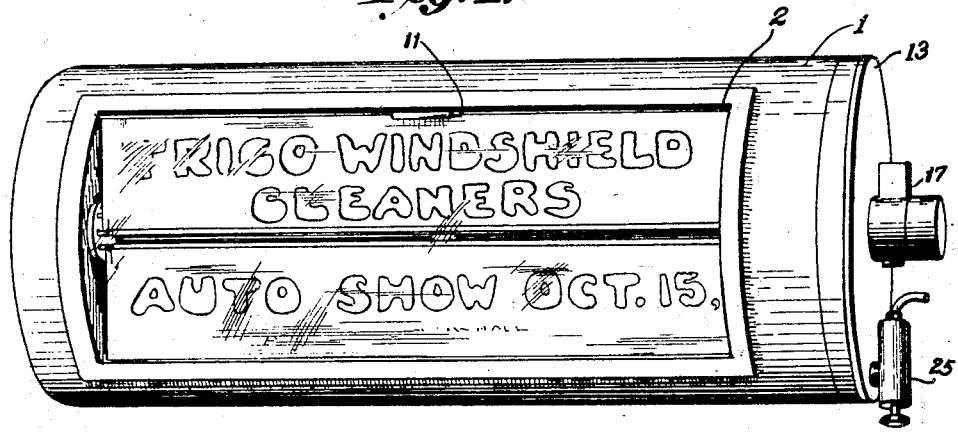
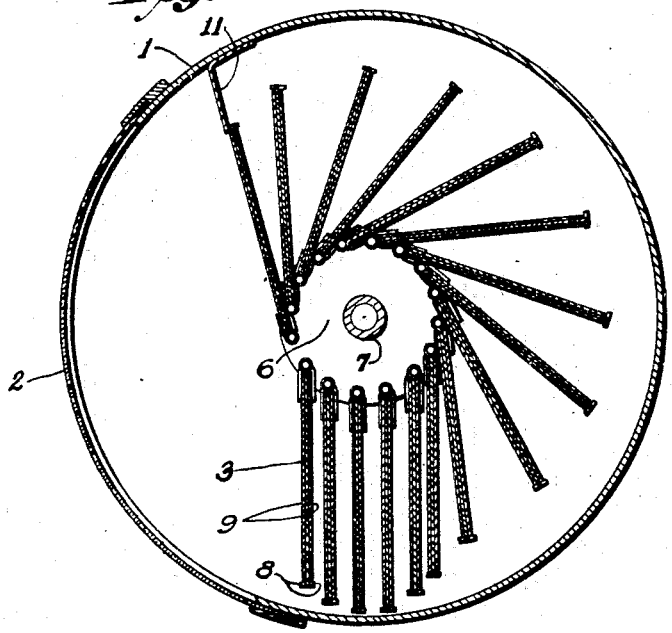
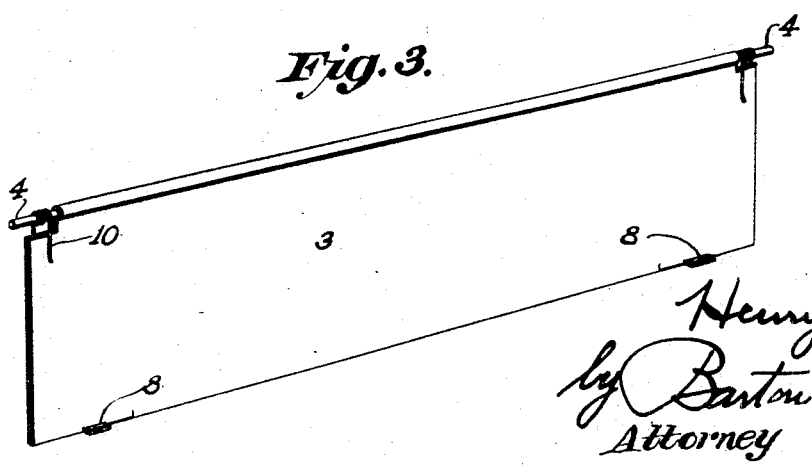

March 8, 1932.  H. HUEBER  1,848,296
ADVERTISING DEVICE
Filed May 11, 1928  3 Sheets-Sheet 2
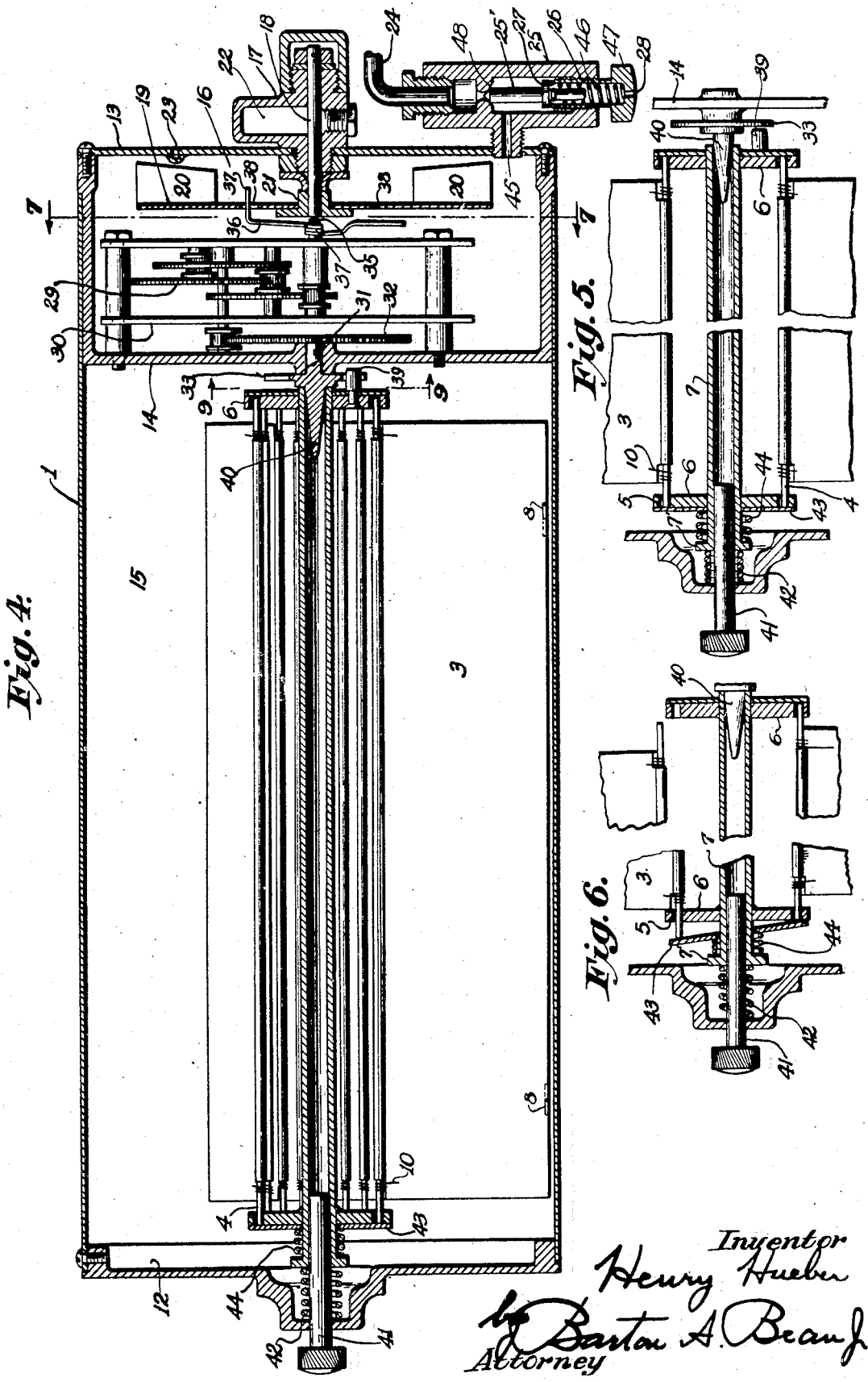

March 8, 1932.  H. HUEBER  1,848,296
ADVERTISING DEVICE
Filed May 11, 1928   3 Sheets-Sheet 3
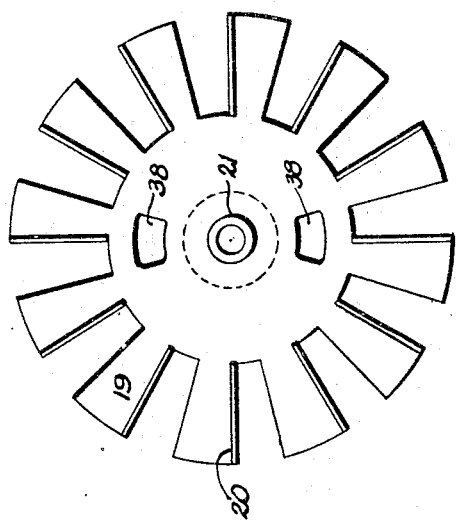
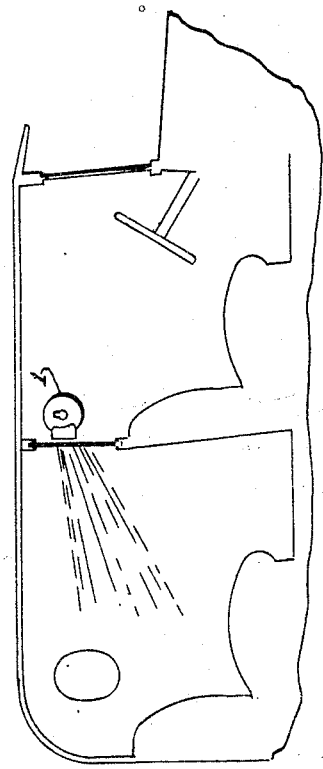
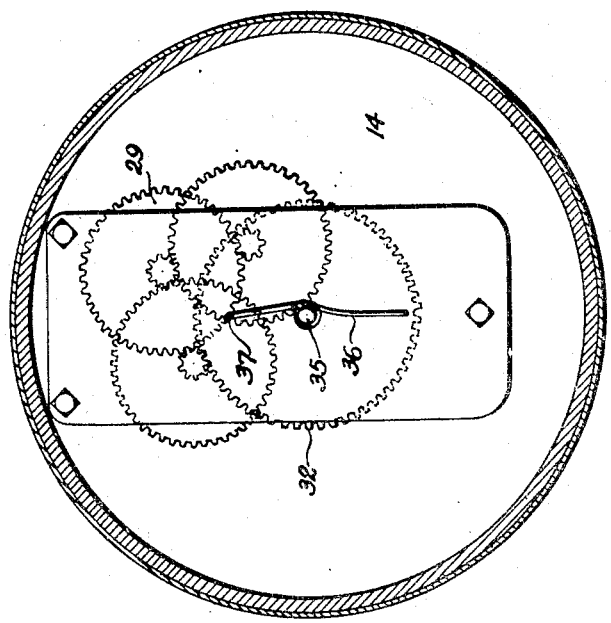

Patented Mar. 8, 1932

1,848,296

UNITED STATES PATENT OFFICE

HENRY HUEBER, OF BUFFALO, NEW YORK, ASSIGNOR TO TRICO PRODUCTS CORPORATION, OF BUFFALO, NEW YORK

ADVERTISING DEVICE

Application filed May 11, 1928. Serial No. 276,884.

This invention relates to an automobile accessory and more particularly to an advertising device especially adapted for motor vehicles, the aim of the invention being to provide a suitable form of advertising device which may be operated by suction as obtained from the intake manifold of the motor vehicle internal combustion engine.

The present invention is designed to supply advertising media for motor vehicular traffic whereby the occupant of automobiles, taxicabs, buses and the like may have advertisements displayed to the passengers during their transit. In motor vehicle transportation the question of properly displaying advertisements so as to be easily read by the passengers is sometimes a problem, especially with respect to taxicabs and vehicles of like build and size which lack high ceilings and much wall space for accommodating advertisements such as are found in street cars.

Various changeable exhibitors have been devised for different vehicular adaptation and driven in different manners, as by electrical motors or from the axle of the vehicle, but their constructions have lacked that simplicity in design and efficiency in operation as to render them objectionable for automobile adaptation and use.

The present invention has for its objects to provide an advertising display device which will be simply constructed and efficiently operable; one which will display a series of advertisements in succession and in such a manner as to attract the attention of the passengers of the taxicab or other vehicle; one which is readily assembled or disassembled in an expeditious manner; one which will utilize the intake suction as its motive power, thereby avoiding any further imposition upon the vehicle storage battery; and one in which the advertising matter may be replaced very easily.

The invention resides in a style of changeable exhibitor having pivoted or hinged leaves in which the leaves are individually mounted for ready displacement and replacement; in the provision of a changeable exhibitor which is operable in a continuous direction through the intermediary of a suction-operated motor; in the provision of a leaf carrier which may readily be disconnected from the power-operator for manual adjustment whereby to facilitate the insertion and replacement of advertisements; and in the novel features of construction and their arrangements and combinations of parts whereby the same may be readily assembled and disassembled, all as will appear more fully hereinafter, reference being had to the accompanying drawings wherein, Fig. 1 is a perspective view showing the improved advertising device.

Fig. 2 is a transverse section through the changeable exhibitor compartment thereof.

Fig. 3 is a detailed perspective of one of the advertisement-bearing leaves of the changeable exhibitor.

Fig. 4 is a longitudinal section through the advertising device.

Fig. 5 is a fragmentary, longitudinal section illustrating the manner of longitudinally shifting the changeable exhibitor to permit manual adjustment thereof.

Fig. 6 is a detailed sectional view illustrating the manner of displaying and remounting the advertisement-bearing leaves.

Fig. 7 is a transverse section through the motor chamber about on line 7—7 of Fig. 4.

Fig. 8 is a face elevation of the turbine or bladed wheel of the suction-operated motor.

Fig. 9 is a cross sectional view through the changeable exhibitor about on line 9—9 of Fig. 4.

Fig. 10 is a diagrammatic showing depicting a taxicab equipped with the advertising device in its approximate display position.

Referring more in detail to the accompanying drawings, the numeral 1 indicates a cylindrical casing having a window 2 therein through which can be viewed the advertisements as they are successively presented by the hinged leaves 3. Each leaf is provided with a pair of trunnions 4 which have pivotal support in bearings 5 of flanges or discs 6, the latter being mounted on a hub or sleeve 7 and comprising, with the discs, a carrier for the hinged or pivoted leaves 3. The free edge of each leaf has advertisement-supporting ledges or rests 8 extending in opposite directions therefrom to support an advertisement-bearing card 9 on each side of the leaf, said cards being engaged at their inner ends by catches such as the resilient fingers 10. Within the changeable exhibitor chamber of casing 2 is an arresting member or stop 11 which projects into the path of the free edges of the leaves and temporarily arrests them in an upper display position and before they drop downwardly to a lower display position following the withdrawal of the leaves from engagement with said arresting stop 11 upon the continued rotation of the leaf carrier in a counter-clockwise direction. In this connection it will be noted that the advertising card is inverted at one side of the holder or leaf relative to the card at the opposite side thereof so as to display a card on each of two leaves simultaneously at the window.

The casing is provided with a closure 12 closing one end thereof and a head 13 closing the opposite end thereof, and is divided intermediate its length by a support or partition 14 into a changeable exhibitor chamber 15 and a separate and distinct motor chamber 16 which is substantially air tight. The motor chamber may be constructed more durably than the exhibitor chamber which is herein depicted as being of sheet metal and has the motor chamber telescoped in one end thereof. Within the head 13 is a journal support 17 in which is mounted a shaft 18 that carries on its inner end, within the chamber 16, a bladed or turbine wheel 19.

The turbine wheel or rotor is of simple construction having its blades 20 struck out from a sheet metal body, which latter is secured to the hub 21 mounted on the shaft 18. A lubricant well 22 may be provided in the journal support 17 for lubricating the shaft in its bearings. In operating the rotor, atmospheric air enters through an aperture 23 in the head 13 and is directed toward the radial blades 20 for impinging thereagainst and impelling the wheel. The chamber 16 communicates through a passageway 45 with the interior of a valve casing 25 which in turn communicates at its upper end through a pipe 24 with a suitable source of suction, such as the intake manifold of an internal combustion engine. A sleeve 26 is threaded into the lower end of the casing 25 and is provided with a head or knob 47 having a bleed port 28 formed therein for purposes presently to be described. A valve stem 25' is mounted for vertical movement within the sleeve 26 for cooperation with a valve seat 48 provided in the casing 25 between the passageway 45 and the pipe 24. The valve stem 25' is provided with a collar 27 which is yieldably maintained in engagement with the upper end of the sleeve 26 by means of an extension coil spring 46 which is suitably secured at its upper end to the valve stem 25' and at its lower end to the sleeve 26. During the normal operation of the device the spring 46 maintains the collar 27 seated upon the upper end of the sleeve 26 thus interrupting communication between the outer atmosphere and the interior of the casing 25 through the bleed port 28. In the event, however, that excess suction should develop the collar 27 will be elevated against the action of the spring 46 out of contact with the upper end of the sleeve 26 and the upper end of the valve stem 25' into closer proximity with the valve seat 48 thus throttling the suction at this point and also permitting air from the outer atmosphere to enter the casing 25 through the bleed port 28. The chamber 16 may be entirely cut off from the source of suction by turning the knob or head 47 so as to elevate the upper end of the valve stem 25' sufficiently to seat tightly against the valve seat 48. In a like manner the throttling action of the valve stem 25' may be accurately regulated. It will be noted that when the collar 27 is elevated so as to establish communication between the outer atmosphere and the interior of the casing 25 through the bleed port 28 under the influence of excess suction, the upward movement of the valve stem 25' is not sufficient to entirely close communication between the source of suction and the interior of the casing 16. The distance between the upper end of the valve stem 25' and the valve seat 48 when elevated under the action of excess suction is entirely dependent upon the vertical adjustment of the sleeve 26.

Within the motor chamber is provided a reduction transmission gearing generally indicated at 29 and preferably carried by a frame 30 which in turn is mounted on the partition 14. In this partition is journalled a shaft 31 having a large gear 32 on its inner end in meshing relation with the transmission 29, and carrying on its opposite end, within the changeable exhibitor chamber 15, a clutch part in the form of a disc clutch member 33, the latter being preferably provided with a plurality of slots 34. Adjacent the bladed wheel or rotor 19 extends a shaft 35 from the transmission 29, and on this protruding shaft is mounted a resilient arm 36 having an angular terminal portion 37 engaging in one of a plurality of openings 38 provided in the body of the rotor. The resilient arm is provided with a coiled portion 37' which is normally of less internal diameter than the diameter of the shaft 35 and which is enlarged sufficiently by untwisting so as to fit over the end of the shaft 35 when the device is assembled. It will thus be seen that when the coiled portion 37' is released it will contract and frictionally bind upon the end of the shaft with sufficient force to provide a driving connection therebetween and, when operating, the driving force will tend to wind the coil into tighter embrace with said shaft.

This arrangement establishes a shock-absorbing driving connection between the rotor and the transmission gearing, and affords a certain degree of resiliency therein, the transmission gearing 29 being of the speed reduction type whereby the work for the suction-operated motor will be reduced and whereby the rotor may have an accelerated speed relative to the movement transmitted to the clutch part 33.

The end of the carrier 6, 7, adjacent the clutch part 33, is provided with a clutch part in the form of a pin 39 which has engagement in one of the notches or recesses 34 thereby coupling the carrier of the changeable exhibitor to the shaft 31. The adjacent end of the carrier is co-axially arranged with the shaft 31 and is supported by a stub part 40 of said shaft.

The opposite end of the carrier is supported on a pin or stub shaft 41 which is slidably as well as rotatably mounted in the head 12. This stub shaft is preferably secured in the adjacent end of the hub or sleeve 7 in any suitable manner such as by a driving fit or by shrinking or sweating. The hub 7 extends along the stub shaft a distance beyond the adjacent disc 6 and provided with a flange 7' between which latter and the head 12 is interposed a coil spring 42 for normally urging the leaf carrier to the right in Fig. 4 so as to hold the clutch pin 39 interengaged with the clutch disc 33. A keeper plate 43 is slidable on the hub 7 between the disc 6 and the flange 7' and this keeper plate is urged against said disc by a spring 44 interposed between said keeper plate and the flange 7'. Said keeper plate is yieldable and tiltable on said hub so that if it is desired to displace one of the leaves the same is slid to the left, as indicated in Fig. 6, so as to disengage first the right hand trunnion from its bearing whereupon the leaf is tilted and withdrawn by a reverse shifting movement thereof. To insert a leaf, the left hand trunnion or pintle is first inserted in its bearing 5 and projected therethrough, forcing the keeper plate 43 backwardly, as indicated in Fig. 6, whereupon the right hand trunnion may be engaged in its bearing following which the keeper plate will return under the influence of the spring 44 against the disc 6 to normally hold the trunnions against displacement.

The advertising device may be disposed in the most convenient location for being readily observed by the passengers of the automobile, the disposition or arrangement for a taxicab being preferably in front of the glass partition immediately behind the taxicab driver so as to be brought in proximity to the passengers in the rear seat. This is indicated diagrammatically in Fig. 10. When it is desired to initiate the operation of the advertising device the control valve is opened so as to unseat the part 25' and thereby establish sub-atmospheric communication between the conduit 24 and the motor chamber 16 whereupon atmospheric air will enter through the inlet 23 under sufficient force to impinge against the blades 20 and impart a rotary movement to the rotor 19. This rotary motion will then be transmitted through the reduction gear 29 to, and very slowly rotate, the changeable exhibitor so that the forward face of the arrested, upper leaf and the rear face of the immediately preceding leaf will be simultaneously presented to the window 2 for a short interval, or until the slowly rotating carrier 6, 7 has withdrawn the upper free edge of the arrested leaf from engagement with the arresting stop 11 whereupon said leaf will drop or swing downwardly and present its rear face to the window along with the forward face of the next succeeding leaf.

It will thus be observed that the suction-operated motor is continuously and rapidly rotating in a single direction and that this rapid rotary motion is transmitted to the changeable exhibitor which also is rotating in a single direction but at a very slow and almost unnoticeable movement. The power derived may be applied through the reduction gearing at a ratio which will develop a power considerably beyond that required for operating the changeable exhibitor. The entire mechanism works smoothly and noiselessly without any particular valve mechanism other than the control valve 25 which may be, as stated above, of the pressure-equalizing type so that the motor operation will also be substantially unified. The interval of display of each advertisement may be approximately one or two minutes so that ample time will be given for digesting and studying the particular display.

The several component parts of the exhibiting device are of simple construction and are easily assembled, the casing 1 being telescoped over the motor casing 13, 14. The power-driven member of the motor is carried by the removable end closure 13 and when the latter is removed the rotor is likewise removed, the connection between the rotor and the transmission gearing being such that upon removal of the end closure 13 such connection will automatically be disrupted and upon replacement of the closure 13 said connection will automatically be made by the passing of the crank arm terminal 37 into the opening 38 of the rotor.

What is claimed is:

1. A suction-operated accessory for motor vehicles, comprising a motor chamber having a rotor therein and provided with an exhaust port and an atmospheric inlet port the latter arranged to direct the inflowing atmosphere against the rotor for imparting rotation thereto, an accessory for being operated by the rotor, and a resilient driving member frictionally connecting the accessory and rotor.

2. A suction-operated changeable exhibitor for motor vehicles, comprising a substantially air-tight motor chamber having a rotor therein and provided with an exhaust port and an atmospheric inlet port, a changeable exhibitor for being operated by the rotor, and a resilient arm operatively connected to the exhibitor and having its outer end slidably extended through an opening provided in said rotor for establishing an operative connection therewith.

3. A changeable exhibitor for motor vehicles comprising a suction-operated motor having a rotary member provided with an eccentrically arranged opening, a rotatable exhibitor having its axis extending in the direction of the axis of said rotary member, a stub shaft arranged substantially co-axially with said rotary member and operatively connected to said exhibitor, and a spring arm having one end freely engaged in the opening of said rotary member and its opposite end coiled about said stub shaft in a direction for coiling into tighter embrace with said stub shaft during the operation of said suction-operated motor.

4. In combination with the intake manifold of an internal combustion engine, a changeable exhibiting device comprising a suction-operated motor connectible to the intake manifold, a changeable exhibitor operatively connected to said motor, and means in the connection between the motor and intake manifold for rendering the operation of said motor substantially uniform under the varying suction influences in the intake manifold.

5. An exhibiting device for motor vehicles comprising a casing having a removable closure plate, a changeable exhibitor arranged in the casing, a fluid pressure driven member carried by the closure plate, and a connection between the member and exhibitor rendered inoperative upon removal of the closure plate and permitting ready removal thereof.

6. An exhibiting device for motor vehicles comprising a motor casing, a suction operated motor therein, a changeable exhibitor casing telescoping the first casing, a changeable exhibitor within the second casing, and power transmission means between the motor and the changeable exhibitor and disposed within the two casings.

7. An exhibiting device for motor vehicles comprising a casing, a changeable exhibitor arranged in one end of said casing, the opposite end of the casing constituting a motor chamber, the end wall at said opposite end of the casing being removable, a rotor journaled in said removable end wall and operatively connected to said changeable exhibitor, and a control for said motor also carried by said removable end wall.

8. An advertising device for motor vehicles comprising a casing having a motor chamber at one end, transmission gearing within said chamber, a fluid pressure operated member arranged in the motor chamber and operatively connected to said gearing, a changeable exhibitor arranged in the casing, means operatively connecting the exhibitor to said transmission gearing, and means for rendering said connecting means inoperative to permit of adjustment of said exhibitor independent of said gearing.

9. An advertising device for motor vehicles comprising a changeable exhibitor, a drive therefor, a connection between the drive and the exhibitor embodying cooperating clutch parts disengageable from each other by and during bodily shifting movement of the exhibitor, means by which the exhibitor may be shifted to disengage the clutch parts, and means for restoring the clutch parts into operative engagement when the exhibitor shifting means is released.

10. An advertising device for use on motor vehicles comprising a casing, a stub shaft journalled therein, means for driving said stub shaft, a rotatable exhibitor slidably supported at one end by said stub shaft, a second stub shaft at the opposite side of the exhibitor connected thereto and rotatably supported in said casing, said second stub shaft being also slidable to shift the exhibitor away from said first stub shaft, and a driving connection between the first stub shaft and the exhibitor rendered inoperative upon shifting the exhibitor axially away from said first stub shaft.

11. An advertising device for use on motor vehicles comprising a casing, a stub shaft journalled therein, a disc on said shaft having an opening therein, means for driving said stub shaft, a rotatable exhibitor shiftably supported at one end by said stub shaft, a second stub shaft slidably and rotatably supported in said casing at the opposite side of the exhibitor, a part on the exhibitor removably engaging in the opening of the disc and constituting a connection between the first stub shaft and the exhibitor rendered inoperative upon shifting the exhibitor axially toward said second stub shaft, said second stub shaft being slidably supported and protruding through the adjacent end wall of the casing, and a spring interposed between said end wall and the exhibitor for normally maintaining said connection operative.

12. A changeable exhibitor comprising a sleeve, spaced discs carried thereby and having opposing bearings therein, a plurality of leaves arranged between said discs and having oppositely extending trunnions engaged in said bearings, the trunnion at one end of each leaf being shiftable in its bearing to withdraw the trunnion at the opposite end thereof from its bearing for demounting the leaves, and a tiltable plate arranged coaxially with said discs for yieldably holding the leaves against being so shifted.

13. A changeable exhibitor comprising a support having opposing bearings therein, a plurality of leaves arranged between said bearings and having oppositely extending trunnions engaged therein, the trunnion at one end of each leaf being shiftable in its bearing to withdraw the companion trunnion from its bearing for demounting the leaves, a movable keeper plate having parts obstructing the shifting of said shiftable trunnions in their bearings and thereby acting to hold said leaves against dislodgment, and means acting to hold the keeper plate against said disc and yieldable therefrom to permit shifting of said leaves.

14. An automobile advertising device to be operated by the suction maintaining within the intake manifold of a motor vehicle internal combustion engine, comprising a rotatable suction-operated motor, a rotatable changeable exhibitor arranged coaxially with said motor, a casing enclosing the motor and the exhibitor, and a transmission mechanism arranged in the casing between the exhibitor and the motor for imparting movement to said exhibitor.

15. A casing divided into an exhibitor compartment and a motor compartment, a changeable exhibitor in said exhibitor compartment, a removable closure for the motor compartment, a suction-operated motor carried by the closure and detachably connected to the changeable exhibitor.

16. An advertising device for motor vehicles, comprising a casing partitioned into an exhibitor chamber and a motor chamber, transmission mechanism carried by the partition of the casing, a suction-operated motor removably arranged in the motor chamber, means connecting the motor to the transmission mechanism upon placement of the motor in its chamber, and a changeable exhibitor arranged in the exhibitor chamber and operatively connected to said mechanism.

17. An advertising device for motor vehicles, comprising a motor housing, a power-driven element therein, transmission gearing arranged in said housing and operatively connected to said power-driven element, a shaft journalled in one wall of the housing and operatively connected to said gearing within said housing, an exhibitor casing closed at one end by said chamber, said shaft projecting through said wall of the housing and into said casing, and a changeable exhibitor arranged in said casing and operatively connected to said projecting driven shaft, said motor housing being removable as a unit to provide access to the interior of said casing.

18. An advertising device for motor vehicles, comprising a fluid motor chamber having an inlet and an outlet, a fluid-driven member arranged in said chamber, transmission gearing arranged within the chamber and operatively connected with said fluid-driven member, said transmission gearing embodying a shaft journalled in a wall of said chamber and projecting exteriorly therefrom, a casing telescoping said chamber and defining with said wall an exhibitor chamber, and an exhibitor arranged in said exhibitor chamber and detachably coupled to said projecting shaft.

19. A suction-operated accessory for motor vehicles, comprising a motor chamber having a rotor therein and provided with an exhaust port and an atmospheric inlet port the latter arranged to direct the inflowing atmosphere against the rotor for imparting rotation thereto, an accessory operated by the rotor, and a resilient drive connection between the accessory and rotor including a radially extending, power transmitting, spring arm.

HENRY HUEBER.

(Over)

CERTIFICATE OF CORRECTION.

Patent No. 1,848,296.  Granted March 8, 1932, to

HENRY HUEBER.

It is hereby certified that error appears in the printed specification of the above numbered patent requiring correction as follows: Page 5, line 60, claim 17, for the word "chamber" read housing; and that the said Letters Patent should be read with this correction therein that the same may conform to the record of the case in the Patent Office.

Signed and sealed this 12th day of April, A. D. 1932.

(Seal)

M. J. Moore,
Acting Commissioner of Patents.